M. F. MALM 3,555,424

MEANS FOR ALLOCATING RADIO LINK CHANNELS IN MOBILE TELEPHONE SYSTEMS

Filed June 21, 1967 2 Sheets-Sheet 1

INVENTOR
MARVIN F. MALM
BY
[signature]
ATTORNEY

United States Patent Office 3,555,424
Patented Jan. 12, 1971

3,555,424
MEANS FOR ALLOCATING RADIO LINK CHANNELS IN MOBILE TELEPHONE SYSTEMS

Marvin F. Malm, Milan, Tenn., assignor to International Telephone and Telegraph Corporation, New York, N.Y., a corporation of Delaware Filed June 21, 1967, Ser. No. 647,746
Int. Cl. H04q 7/00
U.S. Cl. 325—53 14 Claims

ABSTRACT OF THE DISCLOSURE

In a mobile telephone system, all idle channels are marked, and each mobile station lines up on any idle marked channel. Called number codes are sent simultaneously over all idle channels. Any mobile recognizing its code returns an answer tone, and the idle marking tone is removed. When the tone disappears, all mobiles on that channel move off in search of another idle marking. The mobile station includes a paystation.

This invention relates to mobile telephone systems and more particularly to systems having improved means for allocating the radio link channels used in such mobile telephone systems.

Systems of the type which use this invention utilize a plurality of radio links for interconnecting a stationary telephone system with any of many mobile telephone subscriber stations. Generally, the stationary system is owned by a public utility company and connected into the public telephone network.

In one of the old and known systems called the IMTS or MJ systems, the stationary or land based station selects the idle channel which is to be used to complete the next call and marks it to the mobile stations by applying an idle marking tone thereto. Each mobile station includes a channel selector which hunts for and then latches onto the idle marked channel. Whenever, a mobile subscriber station is called or calls over the idle marked channel, the land based station switches the idle marking tone from that idle channel to the next selected channel. Then, the selectors in all other mobile stations release the now busy channel and hunt for the newly marked channel. On calls which are outgoing from the mobile station, the switching of the idle marking tone results from a calling subscriber station going off-hook. On calls which are incoming to the mobile station, the land based equipment sends digital signals which identify the directory number of the called station. All mobile stations in the area monitor these digital signals. When one station recognizes its directory number, it returns an acknowledgment signal. Responsive thereto, the idle marking tone is switched from the channel on which the acknowledgment tone was received to a newly selected idle channel which will be used to complete the next call.

The described IMTS or MJ system is in widespread use. Therefore, any newly developed systems must be compatible with it.

While the described IMTS or MJ system functions very well, it may be improved in a number of ways. For example, it is possible to substantially reduce the cost of the system by a simplification and reduction in the amount of equipment required. Also, the original IMTS or MJ system was designed for use with autos which are not likely to travel at excessive speeds while the telephone is in use. Now, efforts are being made to develop very high speed trains which may travel at speeds of, say 175–200 miles per hour. The switching problems are much different when communications channels are maintained with an auto traveling at 50 m.p.h. and a train traveling 175 m.p.h. Also, a train carries paystations, which are not appropriate to auto telephone stations. Thus, the high speed train system requires coin control which has not been provided in mobile stations heretofore.

Accordingly, an object of the invention is to provide new and improved mobile telephone systems, especially systems for giving service to vehicles traveling at very high speeds by present day standards. A further object is to simplify the switching equipment used to select an idle channel and thereby reduce the system costs. Here, an object is to preserve compatibility with existing equipment while accomplishing these and other objects.

Another object is to provide means for controlling a mobile paystation.

In keeping with one aspect of the invention, these and other objects are accomplished by land based equipment for marking all channels which are idle. The mobile selectors search for and latch onto any channel carrying an idle marking. However, they do not all latch on the same marked channel. Instead, they will distribute themselves over all idle channels in a random manner. To call a mobile station, the digit signals of the called directory number are sent out over every idle marked channel. The mobile station which recognizes its own directory number answers the call on whatever channel it is then monitoring. This answer causes the idle marking tone to be removed from that channel, and all other selectors then monitoring that channel move themselves on to select another idle marked channel.

The above mentioned and other features of this invention and the manner of obtaining them will become more apparent, and the invention itself will be best understood by reference to the following description of an embodiment of the invention taken in conjunction with the accompanying drawings, in which.

Figure 1:
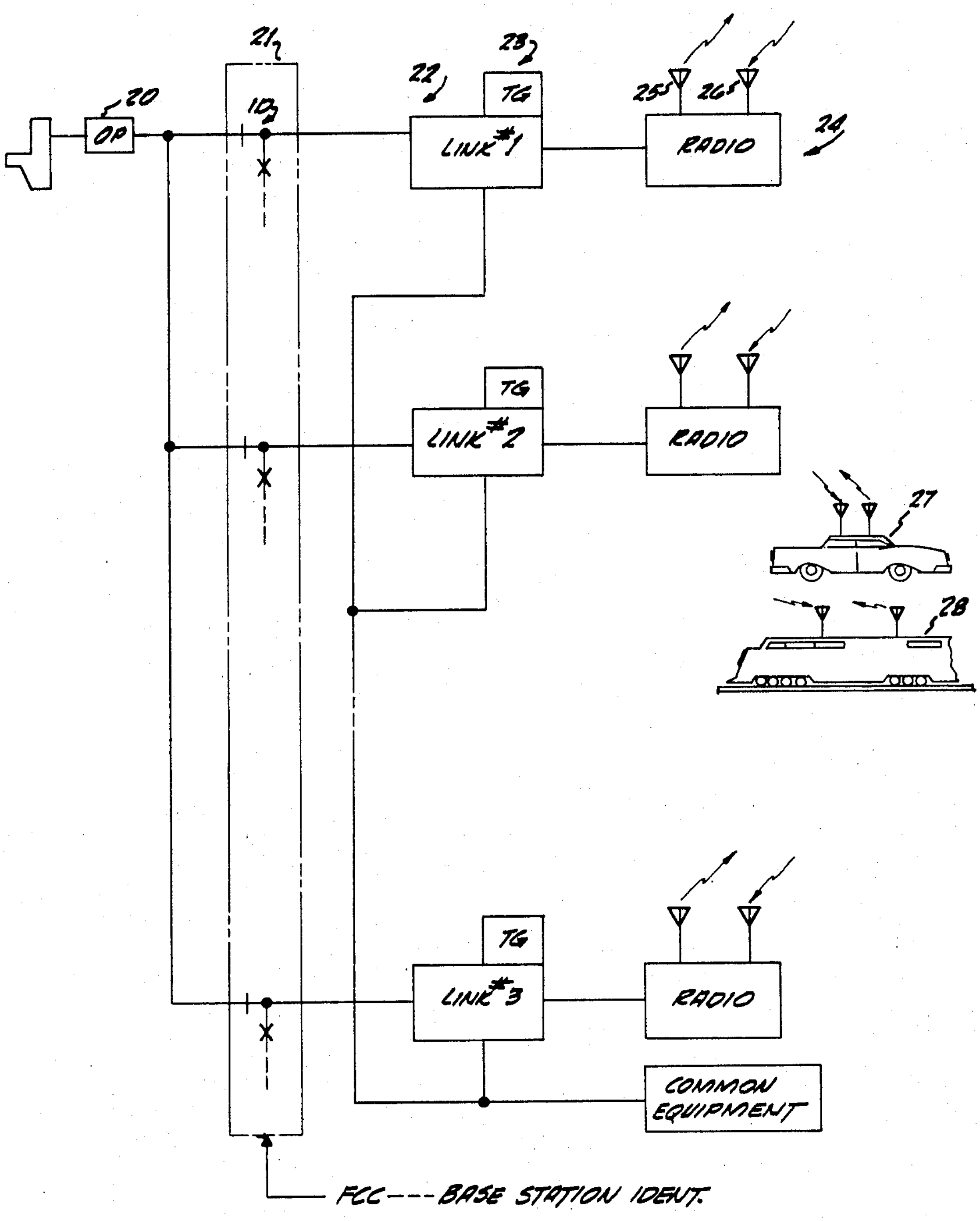
FIG. 1 is a block diagram showing the principles of the invention.

Most of the circuitry of this mobile system is the same as that of the IMTS or MJ system. Therefore, it will not be described in detail. The remaining components, which are distinctive to the invention, include: an operator's outpulsing circuit 20, a base station identification circuit 21, a number of links 22 (there being one link for each radio channel), a tone gate or control circuit 23 for each link, and a radio station 24 having transmitting and receiving antennas 25, 26 individually associated with each link. Each of these antennas represents a one-way radio channel for giving telephone service to and from any mobile station such as an auto station 27 or a high speed train station 28. The base station identification circuit 21 periodically sends a code signal which identifies the radio station 24.

The link circuit 22 is passive during outpulsing and base station identification. More particularly, upon the operated or unoperated condition of an identification relay ID, either the outpulsing trunk circuit 20 or the base station identifier circuit 21 is connected directly through the link 22 to the tone gate circuit 23. This way, the digital signals sent out over the transmitting antenna 25 are under the direct control of the operator's dial (or the identification circuit), with no pulse repeating or other data processing required in the link 22.

Figure 2:
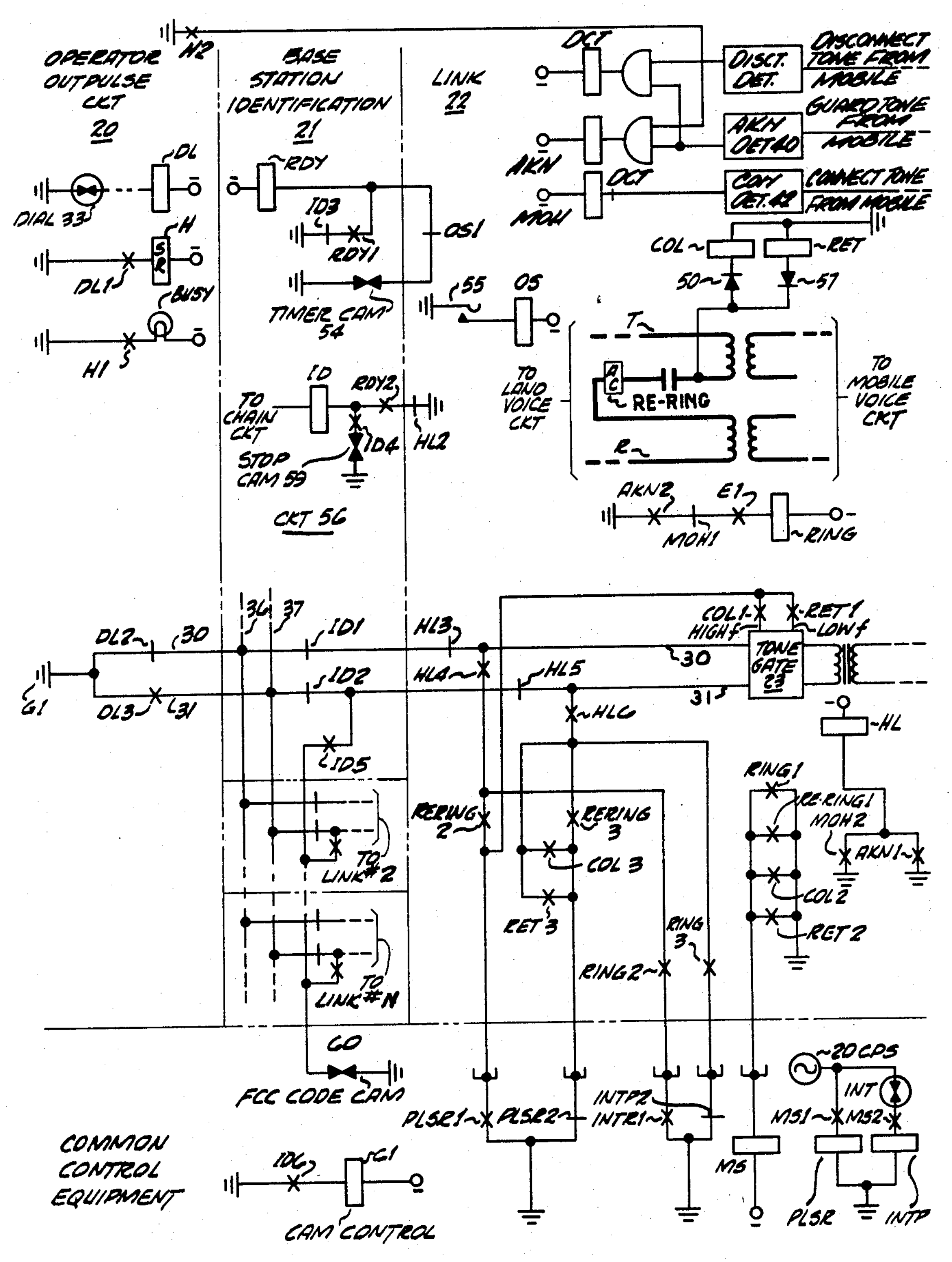
FIG. 2 is a schematic diagram showing those parts of the circuit required to understand the inventive circuits.

The circuits for accomplishing these ends are shown in FIG. 2. Since all components are old and well known relays and similar devices, it is thought that the invention will be understood best from a description of how calls are extended through the circuits.

IDLE CHANNEL MARKING TONE

Before a call is placed, all idle channels are marked by a tone, and each mobile station selects a channel which is so marked. At this time, the dial relay DL is in a normal condition. Make contacts DL1 are open, and hold relay H is released. The contacts DL2 are closed, and the contacts DL3 are open. Thus, a circuit is completed from ground G1 over conductor 30 and through contacts DL2, ID1, HL3 to the tone gate 23. Responsive to this signal, the tone gate circuit 23 causes an idle marking tone to be sent out over the associated radio channel to the mobile stations.

LAND TO MOBILE CALL

The operator, at the position associated with the circuit 20, couples to the system by operating a suitable key. (Of course, any other automatic switching equipment could also be used to select the channel.)

The operator manipulates a dial 33 to operate and release the dial pulse relay DL a number of times corresponding to the value of the digit dialed. When the contacts DL1 close, the hold relay H operates and closes the contacts H1 to mark the circuit 20 as busy, in any suitable and known manner, and contacts H2 close to enable the links to respond to the acknowledge tone signal from the called mobile. Symbolically, this busy marking is indicated by a lit "busy" lamp. As this relay DL releases and reoperates responsive to each dial pulse, contacts DL1 open and close, but hold relay H holds in an operated condition owing to its own slow release characteristics. The contacts DL2, DL3 also open and close responsive to dial pulsing to shift the frequency of the outgoing tone signals. The effect is that one tone (controlled by contacts DL3) is interrupted a number of times corresponding to the number of the digit that was dialled. The other frequency (controlled by the contacts DL2) is a guard tone inserted between dial pulses so that fading signals may be detected.

Every link which is idle sends the same directory number. This is seen in the drawing since the conductors 30, 31 connect to the busses 36, 37, respectively. Thus, the wires marked "To Link #2" and "To Link #N" lead to tone gates (not shown) similar to gate 23. Therefore, all links send out idle tone when idle and the same directory number when the dial is operated.

The dial pulses which are sent out are the directory number of the called mobile station. The equipment in each idle mobile station monitors the dial pulses which it receives. One station recognizes its own code, and it returns an acknowledging tone signal (called a "guard tone") over the one idle channel which it is then monitoring. An acknowledgment detector 40 individually associated with the monitored channel recognizes this tone and operates relay AKN. The contacts AKN1 close to operate a hold relay HL. Relay HL opens contacts HL2 to prevent any base station identification while the channel is busy. Contacts HL3 and HL5 open the wires 30, 31 to prevent the tone gate 23 from making any further response to the signals received over the line 30, 31. The contacts HL4 and HL6 close to prepare to transmit a ringing control signal through the tone gate 23 to the called station.

This ringing signal is sent as a result of the following circuit operations. The acknowledgment relay AKN operation closes contacts AKN2. The subscriber station is on-hook because the called party has not yet answered; thus, contacts MOH1 are closed. When the land based equipment is ready to send out a ringing signal, the well known E relay operates contacts E1 (this relay is controlled by E and M signals). Therefore, the RING relay operates. Contacts RING1 close an obvious circuit to operate relay MS. Contacts RING2 and RING3 close a circuit to an interrupted ringing circuit in common control equipment. The relay MS closes contacts MS1 and MS2 to connect relays PLSR and INTP to a 20 c.p.s. source. The source for relay INTP is interrupted by a mechanical cam INT to give a well known interrupted ringing signal.

As relay INTP follows the interrupted—20 c.p.s.—ringing signals, the make contacts INTP1 and break contacts INTP2 open and close to alternately mark the conductors 30, 31 leading to the tone gate 23. The equipment recognizes this interrupted 20 c.p.s. shifting of ground marking as a command to ring a bell at the mobile subscriber station.

The called subscriber responds to this ringing signal by removing a handset and thereby returning connect tone. This tone causes the detector 42 to conduct, and the mobile off-hook relay MOH operates. Contacts MOH1 open, and relay RING releases. Contacts RING2 and RING3 open to disconnect the interrupted ringing signal sending contacts INTP1 and INTP2. The contacts MOH2 close to latch the hold relay HL in an operated position. Conversation follows.

When the called subscriber hangs up, guard and disconnect tones appear momentarily, and relays MOH and AKN release. Contacts MOH1 close and AKN2 open without effect. Contacts MOH2, and AKN1 open to release the hold relay HL. Hold relay HL drops and contacts HL4 and HL6 open while contacts HL3 and HL5 close to return the tone gate 23 to its normal idle condition. The idle marking returns to the channel responsive to the completion of the circuit traced from ground through the contacts DL2, ID1, HL3, and the gate circuit 23.

The circuit is now normal and ready for the next call.

MOBILE TO LAND CALL

Assume next that the calling mobile subscriber goes off-hook. Guard and connect tones are simultaneously sent from the mobile station. The tone detector 42 conducts, and relay MOH operates. Contacts MOH1 open to prevent any transmission of ringing control current since no ringing current is required when a mobile is calling. Contacts MOH2 close to operate the hold relay HL.

Responsive to the operation of relay HL, the contacts HL3, HL5 open to remove idle marking tone and to prevent any control over the tone gate circuit 23 from the outpulsing circuit 20.

Any suitable equipment in a land based station completes the call under the control of the mobile subscriber. Since this portion of the system is part of the well known IMTS or MJ system, no effort is here made to explain it further.

COIN CONTROL

Next assume that the calling mobile station is a paystation—part of a telephone booth on the train 28, for example. The voice circuit is completed via the heavily inked conductors in FIG. 2. The operator may re-ring the mobile station by applying ringing current across the tip and ring conductors T and R, collect coins by applying a positive potential to the tip conductor T, or refund coins by applying a negative potential to the tip conductor T.

In greater detail, suppose that the operator wants to re-ring the mobile paystation. Such a re-ring might be required when an operator wants to re-call a calling subscriber who has hung up and tell him that he talked for a period of time which is longer than that covered by the deposited coins. The link circuit will return seize tone to mobile, causing it to lock on the channel under control of the operator. The operator pushes her ring key and sends normal ringing current over the tip and ring conductors T and R, respectively.

The A.C. RE-RING relay operates. Contacts RE-RING1 close to operate relay MS. Contacts RE-RING2 and 3 close to connect the contacts PLSR1 and PLSR2 to the line 30, 31. Contacts MS1 close when relay MS operates, thereby connecting the relay PLSR to a source of 20 c.p.s. Hence, the contacts PLSR1 and PLSR2 apply ground to the conductors 30, 31 alternately. The mobile station recognizes this as a ringing signal and rings a bell at the mobile telephone. When the operator releases her ring key, the ringing stops at the mobile station.

To collect coins, the operator applies a positive potential to the conductor T. The diode 50 passes current to operate the collect relay COL. The contacts COL1 close to cause a high frequency tone to be sent out to the paystation. Contacts COL2 close to operate relay MS. Contacts COL3 close a circuit between the ground applied through the contacts PLSR2 and gate 23. The 20 Hz. alternating ground signals applied through contacts COL1 to line High *f* and through contacts PLSR2 to line 31 sends out a suitable tone signal which causes the mobile station to collect any coin which may be deposited there.

To return a coin, the operator applies a negative battery to conductor T. Diode 51 conducts, and relay RET operates. Contacts RET1 close to apply a low frequency tone to the mobile. Contacts RET2 close to operate relay MS for connecting the 20 c.p.s. tone source through contacts MS1 to relay PLSR. Contacts RET3 connect the ground at the contacts PLSR2 to the line 31. The resulting 20 Hz. alternating tone signal is received by the mobile station for operating the coin control mechanism in a refund direction.

Paystation coin control signals may be sent to the mobile station in an off hook or on hook condition. The mobile station is released to search for an idle marked channel when the operator disconnects.

BASE STATION IDENTIFICATION

Government regulations generally requires every broadcasting station to identify itself at regular intervals. This is done by circuit 21.

A timer cam 54 closes periodically, as required by government regulations—for example, if idle stations must identify themselves hourly, the timer cam closes once every hour. If the station is out of service and not broadcasting, the manually controlled key 55 is closed to operate relay OS and open contacts OS1 so that the timer cam 54 causes no effect. However, if the station is in service, key 55 is open, relay OS is released, and contacts OS1 are closed so that ready relay RDY operates from the ground applied through the timer cam 54.

The contacts RDY1 close to lock the ready relay RDY operated via contacts ID3. The contacts RDY2 close. If the channel is busy, the contacts HL2 are open so that nothing happens immediately. However, if the channel is idle, or when it becomes idle, a circuit is completed from ground through the contacts HL2, RDY2 and the winding of an ID relay to a chain circuit which allows only one ID relay to operate, and one link to identify itself, at any given time. When the chain circuit is completed, relay ID operates.

Responsive to its operation, the identification relay ID locks over its contacts ID4 to a cam controlled contact 59 which closes at the end of the identification code. Contacts ID3 open to restore the ready relay RDY. Contacts ID1, ID2 open to disconnect the outpulse circuit 20, while the contacts ID5 close to connect the tone gate 23 to a bus leading to a machine driven cam 60 which opens and closes a set of contacts in a code that identifies the station. The contacts ID6 close to start a cam control relay 61 which causes a reading out of the identifying code. The resulting signals sent out from the tone gate 23 identify the radio station. At the end of the cam sent code signals, the stop contacts 59 open to release the identification relay ID. The circuit has now returned to normal.

While the principles of the invention have been described above in connection with specific apparatus and applications, it is to be understood that this description is made only by way of example and not as a limitation on the scope of the invention.

I claim:

1. A mobile telephone system comprising land based and mobile equipment, means for interconnecting said land and mobile equipment by any of a plurality of radio channels, means for marking all idle ones of said channels by an idle marking tone, means in said mobile equipment for selecting and latching on any idle one of said channels, and means in said land based equipment for selectively signaling an identified called mobile station via all of said idle channels.

2. The telephone system of claim 1 and means in each of said mobile stations for monitoring the channel on which it is latched for said selective signals, and means responsive to the detection by a mobile station of its own identification for returning an acknowledgment signal over the channel on which it is latched.

3. The telephone system of claim 2 and means responsive to said acknowledgment signal for removing said idle marking tone from the channel on which said mobile station returned said acknowledgment signal.

4. The telephone system of claim 3 including means for controlling the collection and return of coins via said radio channel.

5. A telephone system as claimed in claim 1, in which the mobile equipment includes elements forming a mobile paystation, and means are included for controlling said mobile paystation from said land based station via a radio channel to said mobile paystation.

6. The telephone system of claim 5 and means responsive to land based control for re-ringing said mobile paystation.

7. The telephone system of claim 5 and means responsive to land based control for collecting coins at said mobile paystation.

8. The telephone system of claim 5 and means responsive to land based control for refunding coins at said mobile paystation.

9. A telephone system comprising a land based network and a plurality of mobile telephone stations, a plurality of radio channels for interconnecting said land based network and said mobile stations, each radio channel including a link circuit individually associated therewith, and means for transmitting control signals between said land based network and said mobile stations simultaneously through all idle link circuits, and means for retaining said link circuits in an idle condition during the transmission of said control signals.

10. The telephone system of claim 9, wherein said control signals comprise a selected plurality of tone signals, a plurality of tone gates in each link circuit, and means for connecting said land based network to directly control said tone gates in said link circuits.

11. The telephone system of claim 10, wherein at least one of said mobile stations is a paystation, and means for extending a voice path through one link circuit, and means in said one link circuit for controlling said mobile paystation responsive to signals appearing on said voice path.

12. The telephone system of claim 11, further including means for ringing said paystation responsive to an appearance of ringing current on said voice path, said means for controlling said mobile paystation including means for collecting coins responsive to an appearance of a collect potential of first polarity on said voice path, and means for refunding coins responsive to an appearance of a refund potential of second polarity on said voice path.

13. A telephone system comprising a plurality of mobile telephone stations and a plurality of land based stations, means comprising a plurality of links each having tone gates for controlling the transmission of tone signals sent from said land based stations to said mobile stations, means for controlling calls from said land based stations, land based station identification means, and means for connecting all idle tone gates directly to either said call controlling means or said land based station identification means for signalling through all said idle tone gates, and means for retaining all said links in an idle condition during said signalling.

14. The system of claim 13, further including periodically effective means for automatically connecting said land based station identification means to one tone gate if the channel served by said one gate is then idle, means for inhibiting said automatic connection if said one channel is busy, and means for removing said inhibition when the channel becomes idle.

References Cited

UNITED STATES PATENTS

| | | | |
|---|---|---|---|
| 2,176,868 | 10/1939 | Boswau | 325—31 |
| 2,649,540 | 8/1953 | Homrighous | 325—31 |
| 2,694,141 | 11/1954 | Mitchell | 325—31 |
| 3,065,421 | 11/1962 | Hart | 325—16 |
| 3,345,659 | 10/1967 | Casterline et al. | 325—64X |
| 3,363,250 | 1/1968 | Jacobson | 325—64X |
| 3,399,385 | 8/1968 | Gorman et al. | 325—31 |
| 3,418,577 | 12/1968 | Fischer | 325—64X |
| 3,431,363 | 3/1969 | Miller | 325—55X |
| 2,694,141 | 11/1954 | Mitchell | 250—6 |
| 3,377,435 | 4/1968 | Lippert | 179—41 |
| 3,458,664 | 7/1969 | Adlhock | 179—41 |

ROBERT L. GRIFFIN, Primary Examiner

K. W. WEINSTEIN, Assistant Examiner

U.S. Cl. X.R.

179—6.3, 41; 325—55, 64